United States Patent

[11] 3,614,442

| [72] | Inventor | Robert S. Brodsky<br>7605 New Castle Drive, Annandale, Va. 22003 |
|---|---|---|
| [21] | Appl. No. | 32,677 |
| [22] | Filed | Apr. 28, 1970 |
| [45] | Patented | Oct. 19, 1971 |

[54] POCKET ALARM DOSIMETER
6 Claims, 3 Drawing Figs.

| [52] | U.S. Cl. | 250/83.6 R, 250/83.3 PD |
|---|---|---|
| [51] | Int. Cl. | G01t 1/18 |
| [50] | Field of Search | 250/83.3 PD, 83.6 P, 83.6 R |

[56] References Cited
UNITED STATES PATENTS

| 3,019,339 | 1/1962 | Wesley | 250/83.6 R |
|---|---|---|---|
| 3,214,588 | 10/1965 | Cooke-Yarborough | 250/83.6 R |
| 3,443,097 | 5/1969 | Smith | 250/83.6 R |

*Primary Examiner*—Archie R. Borchelt
*Attorney*—Dawson, Tilton, Fallon & Lungvaus

ABSTRACT: A portable pocket alarm dosimeter employs an electronic radiation counter where total dosage is accumulated in digital form in a serial counter. An alarm is provided for advance warning at a preset integrated radiation dosage. The integrating device retains 100 percent of the pulses generated by the counter. The alarm levels can be readily changed to correspond to any particular application because of its extreme accuracy and its ease of adjustment.

INVENTOR.
Robert S. Brodsky
ATTORNEY.

POCKET ALARM DOSIMETER

BACKGROUND OF THE INVENTION

There exists a need for a pocket-size dosimeter having great accuracy in both the dosage integration and the alarm set point. There are presently numerous portable dosimeter units. Some prior art dosimeters are capable of indicating radiation levels or alarming at preset integrated dosage levels. These devices integrate the output of a radiation counter unit by means of various analog devices. One device uses capacitive storage units in which the total charge present on the capacitor is functionally dependent on the total number of accumulated radiation units. Another device utilizes an electrochemical integration device which provides integration by means of a chemical reaction. Both of these devices have inherent deficiencies which the invention described herein eliminates. These deficiencies relate to the accuracy of the dosage integration and the accuracy at which the alarm set point can be chosen. The capacitor analog integrator has a finite leakage associated with it. Features must be incorporated to compensate for this leakage and due to this leakage the time duration over which the radiation dosage can be accurately accumulated is limited. The alarm level set point accuracy is independent of the problems associated with the inherent accuracy of the integrating device in these analog accumulators and is a question of establishing an accurate calibrated alarm set point which is not subject to drift. The features of this invention cooperate to solve or do away with the problems enumerated above.

SUMMARY OF THE INVENTION

The objects of this invention are to provide an improved electronic dosimeter having an integrating device which retains 100 percent of the pulses generated by a counter and which further provides for the establishment of an accurate alarm set point which is triggered by the presence of an Xth pulse coming out of the counter tube where X is the total number of counts required to achieve the alarm dosage.

Other features of this invention are the accurate recording of the accumulated dose at the end of any period through the use of a digital readout device. In addition, because of the digital nature of the register the performance and accuracy of this portion of the device can be rapidly checked through digital means. The dosimeter set forth here is suitable for use in industrial applications, by workmen in crowded and confined spaces and in areas subject to large environmental changes since it is a compact, portable, lightweight unit insensitive to shock, vibration and temperature change.

BRIEF DESCRIPTION OF THE DRAWINGS

Further understanding of the present invention may be had from consideration of the accompanying drawings in which:

In FIG. 1, a transistorized high-voltage power supply 1 is used to convert the voltage furnished by a battery 2 to a high-voltage which is in turn applied to a Geiger-Mueller counter tube 3. Radiation incident on the counter tube 3 results in pulses being fed to an audio alarm circuit 4. In addition to supplying these pulses to the audio alarm circuit, pulses are also fed to an integrator-register 5 which is used to accumulate the number of counts in a digital register. When sufficient counts have been received to fill the register to the preset alarm set point the register will activate the latch 6. The latch will turn "On" and will hold the "on" condition until the dosimeter has been reset. The latch, in turn, will activate the audio oscillator 7 whose output is fed back through the audio alarm circuit to drive the alarm speaker 8. In the presence of a radiation field, pulses from the output of the Geiger tube will be heard as blips on the speaker in the alarm circuitry. The frequency of blips will be an indication of the level of the field. Upon reaching the preset dose level the audio oscillator tone will override the blips and will indicate to the user that the alarm set point has been reached.

DESCRIPTION OF THE PREFERRED EMBODIMENTS

Figure 1:
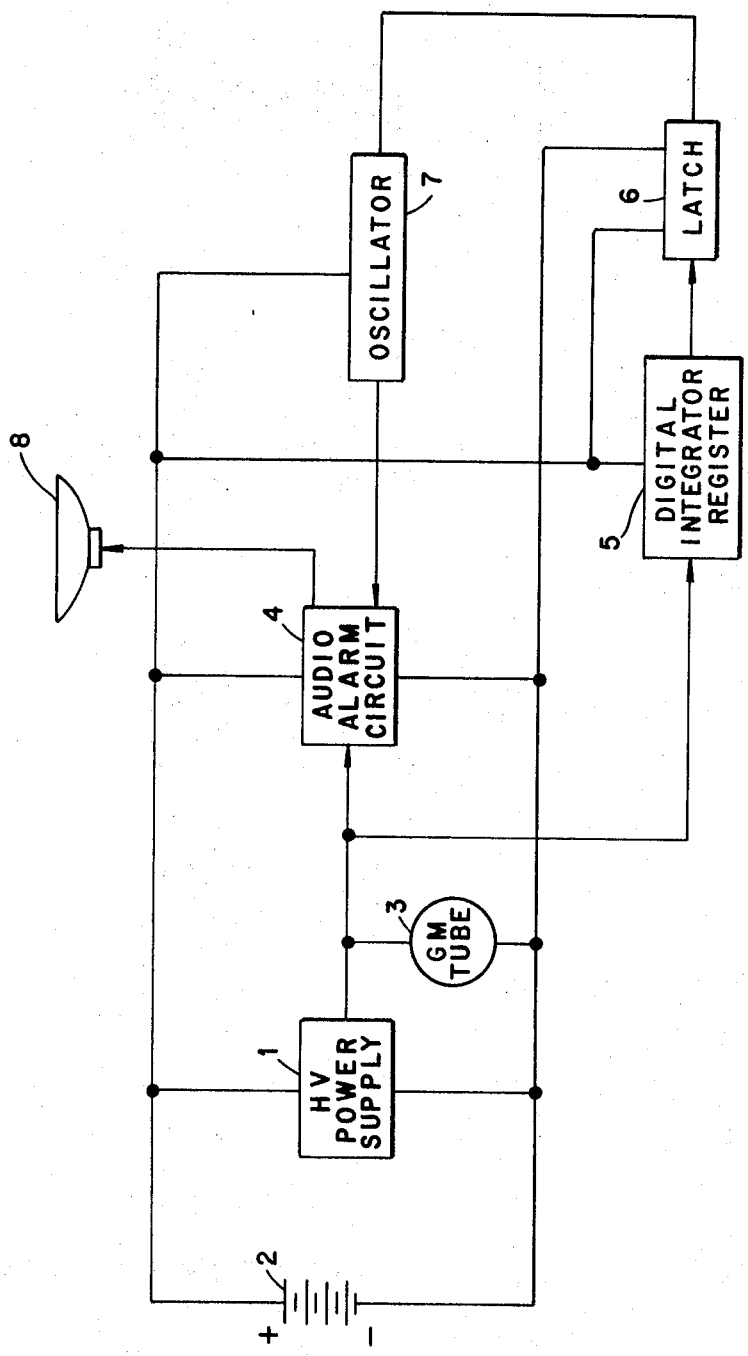
FIG. 1 is a block diagram of the preferred embodiment of the invention.
Figure 2:
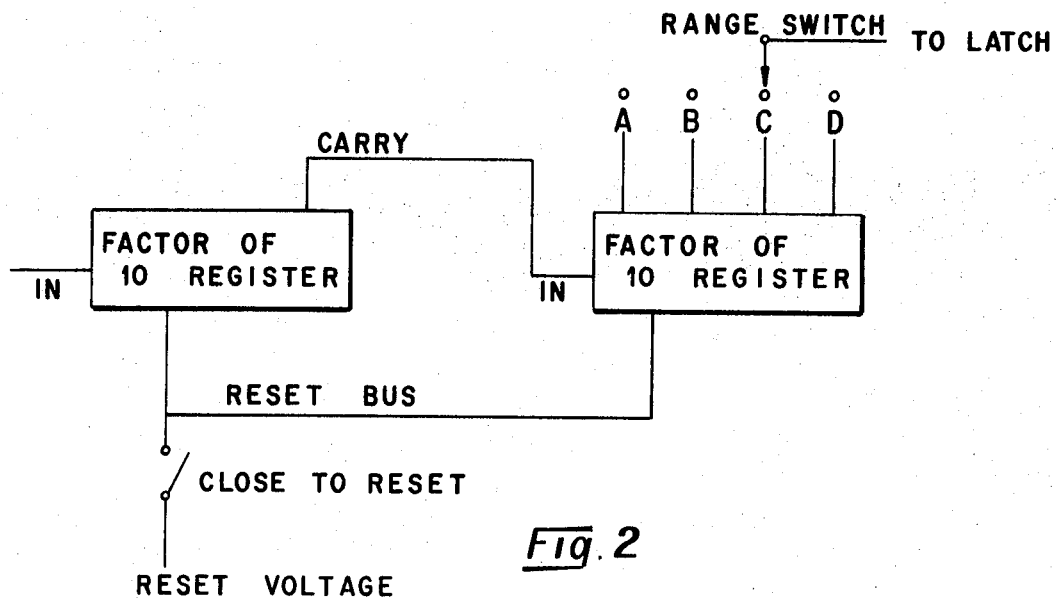
FIG. 2 is a block diagram representation of a typical digital register with binary readout.
Figure 3:
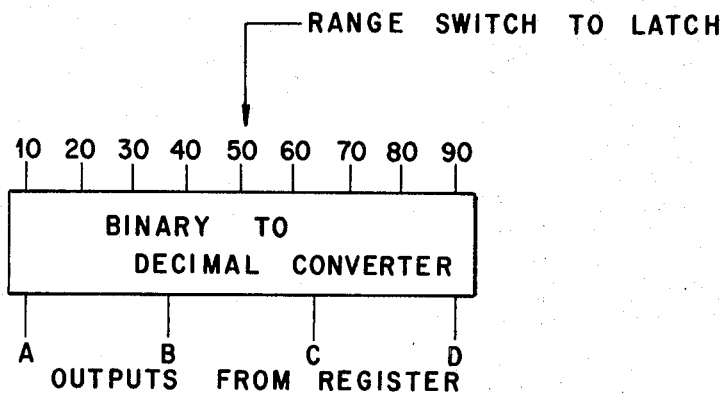
FIG. 3 is a block diagram representation of a binary to decimal converter.

The integrator-register 5 utilized in this device is made-up of a serial counter or series of counters which have sufficient capacity to accumulate the total number of counts required to obtain the desired dose levels. For example, depending on the sensitivity of the Geiger tube somewhere between 100,000 to 1 million total counts may be required to achieve a dose level in the range at which alarm indication is desired. Six decade counters arranged in series would provide this range of set points. These decade counters are made up of integrated circuits which utilize transistorized flip-flops arranged with feedback to provide the necessary capacity. Commercial integrated circuit counters are available in a range per circuit of divide-by-10 to divide-by-16. For example, FIG. 2 shows a typical register with a capacity of 100 and a range of set points from 10 to 80. It has a range switch for directly selecting outputs from the register where A=10, B=20, 40, D=80. It is possible that higher ranges per circuit element could be obtained by including more integrated circuit chips per circuit. Provisions can be made in the later stages of the counters to enable the alarm set point to be taken from the different logic points in the counters. If greater range selection is required, a binary to decimal integrated circuit is used as in FIG. 3. A binary-to-decimal converter is shown which is interposed between the output of the register and the input to the latch circuit. Discussion concerning the design of serial counters which would apply in this context can be found in Motorola Application Note AN-194.

The latch circuit which is activated by the turning "on" of the desired flip-flop in the serial counters can be either an SCS or SCR which, once triggered, will provide power to the alarm oscillator. Such an oscillator could utilize a unijunction transistor. Other types of oscillators are also applicable using various types of multivibrator circuits. Generally the frequency of the oscillator will be set in the range of 2,000–3,000 Hertz to provide an alarm signal which can be heard over background noises. It is also possible to use in place of the alarm oscillator and the speaker solid state miniature alarm devices. Resetting of the device is accomplished through an internal switch or through an external plug connection which applies the reset voltage both to the registers (which will clear to zero) and to the latch circuitry which will turn off the SCR and SCS.

The register may be tested by the use of a crystal-controlled oscillator and logical gates. The oscillator provides a test source to the integrator to be tested in parallel with a known standard counter. The simultaneous output of these two counters as detected by gates can be used as an indication of satisfactory performance of this part of the system. It is possible to obtain an external readout of the register's contents by providing plug contacts to the various terminals in the integrator device. Thus at the end of its use the dose could be accurately read out and, if desired, recorded automatically.

Many cases of overexposure to personnel working with radiation have resulted from individuals ignoring warning indications available to them from radiation monitoring equipment. Discovery of the overexposure results days later upon development of their film badges. The individuals then claim that the radiation monitoring equipment they had was not operating properly. It is believed that in many of these cases the overexposure was a result of the worker ignoring his monitoring equipment. One feature of this invention is that if the dose level is exceeded and the worker receives an alarm the device could be made so that the alarm could only be cleared by a special means controlled by a supervisor. This is accomplished by making the reset switch inaccessible to the user.

The reset switch could be placed inside the dosimeter case which would be locked. Only the supervisor would have a key. In this manner the user would know that he could not claim a malfunction of the device.

An abbreviated version of this device could be made which would consist of only one or two decades of register combined with a simplified indicator and latch assembly; for example, an indicator light in place of an oscillator. This device could be used by workers who normally work in nonradiation areas but who need some form of indication in the event they accidentally enter a radiation area. This device would not be used to measure accumulated dose or to alarm on accumulated dose, but would give an audible clicking in a radiation field and would have a latching indicator to show that the wearer of the device had entered a radiation area and that the device had operated to warn the worker that he was in such an area. This proof of performance would increase the probability that the user of the device would heed its warnings.

The dosimeter described constitutes a distinct improvement in the art since the digital characteristics of the signal are retained throughout with the accompanying improvement of reliability and accuracy.

What is claimed is:

1. A pocket radiation dosimeter system comprising: radiation countertube means producing output pulses in response to sensed radiation incidents; audio alarm circuit means responsive to said output pulses to produce a first audible indication of radiation level; digital register circuit means responsive to output pulses from said countertube means for generating and storing electrical digital signals representative of the total counts from said tube; first circuit means responsive to the digital signals stored in said register means for continuously generating an alarm signal when a predetermined digital signal representative of an alarm dosage level is stored in said registered means until said circuit means is reset; and alarm drive circuit means responsive to an alarm signal generated by said first circuit means to drive said audio alarm circuit to produce a second audible indication to override said first audible indication when said alarm dosage level is reached.

2. The system of claim 1 wherein said countertube means is characterized by producing pulses proportional to the number of radiation events sensed, and wherein said audio alarm circuit means includes a transducer, said first audible indication being sensed by the wearer as blips produced by said transducer.

3. The system of claim 1 wherein said digital register circuit means comprises serial electronic counter circuits for storing and generating a digital signal representative of the total number of radiation incidents sensed by said countertube means.

4. The system of claim 3 further comprising range switch means connected in circuit with outputs of said serial counter circuits for selecting one of said outputs as representative of an alarm dosage level, and for transmitting said selected signal to energize said first circuit means.

5. The system of claim 1 further comprising reset circuit means operatively associated with said register circuit means for selectively resetting said register circuit means thereby to reset said first circuit means at the same time.

6. The system of claim 1 wherein said alarm drive circuit means includes an audio oscillator circuit responsive to the signal from said first circuit means for continuously driving said audio alarm circuit to produce said overriding alarm signal.

Notice of Adverse Decision in Interference

In Interference No. 98,156, involving Patent No. 3,614,442, R. S. Brodsky, POCKET ALARM DOSIMETER, final judgment adverse to the patentee was rendered July 25, 1974, as to claims 1–6.

[*Official Gazette December 24, 1974.*]